US010254862B2

(12) United States Patent
Lin et al.

(10) Patent No.: US 10,254,862 B2
(45) Date of Patent: Apr. 9, 2019

(54) STYLUS AND TOUCH CONTROL METHOD

(71) Applicant: ASUSTeK COMPUTER INC., Taipei (TW)

(72) Inventors: Chin-Wen Lin, Taipei (TW); Hung-Yi Lin, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 3 days.

(21) Appl. No.: 15/641,474

(22) Filed: Jul. 5, 2017

(65) Prior Publication Data

US 2018/0024652 A1    Jan. 25, 2018

Related U.S. Application Data

(60) Provisional application No. 62/364,026, filed on Jul. 19, 2016.

(30) Foreign Application Priority Data

Apr. 10, 2017    (TW) .............................. 106111942 A

(51) Int. Cl.
    *G06F 3/038*    (2013.01)
    *G06F 3/041*    (2006.01)
    *G06F 3/044*    (2006.01)
    *G06F 3/0354*   (2013.01)

(52) U.S. Cl.
    CPC ........ *G06F 3/0383* (2013.01); *G06F 3/03545* (2013.01); *G06F 3/044* (2013.01); *G06F 3/0416* (2013.01)

(58) Field of Classification Search
    CPC .............................. G06F 3/03545; G06F 3/083
    See application file for complete search history.

(56) References Cited

U.S. PATENT DOCUMENTS

| 9,864,441 B2 * | 1/2018 | Geller ................. G06F 3/03545 |
| 2012/0327042 A1 * | 12/2012 | Harley ................ G06F 3/03545 |
| | | 345/179 |
| 2013/0300719 A1 * | 11/2013 | Wang ..................... G06F 3/046 |
| | | 345/179 |
| 2015/0160782 A1 * | 6/2015 | Park ...................... G06F 3/0418 |
| | | 345/174 |
| 2015/0338949 A1 | 11/2015 | Westerman |
| 2016/0378212 A1 * | 12/2016 | Kim .................... G06F 3/03545 |
| | | 345/173 |
| 2017/0068337 A1 * | 3/2017 | Bhandari ................ G06F 3/044 |
| 2018/0129310 A1 * | 5/2018 | Haran ................. G06F 3/03545 |

* cited by examiner

*Primary Examiner* — Lixi C Simpson
(74) *Attorney, Agent, or Firm* — McClure, Qualey & Rodack, LLP

(57) ABSTRACT

A stylus adapted to a touch panel is provided. The stylus comprises a barrel, a driving circuit disposed inside the barrel and configured to generate a driving signal, a conductive tip disposed at an end of the barrel and electrically connected to the driving circuit to receive the driving signal, and a conductive grip disposed at the barrel and electrically isolated from the conductive tip. The conductive tip is capacitively coupled with the touch panel via the driving signal to form a first induced capacitor on the touch panel. A capacitance effect is generated between the conductive grip and the touch panel to form a second induced capacitor on the touch panel. A touch control method is also provided.

10 Claims, 10 Drawing Sheets

STYLUS AND TOUCH CONTROL METHOD

CROSS-REFERENCE TO RELATED APPLICATION

This application claims the priority benefit of U.S. provisional application Ser. No. 62/364,026, filed on Jul. 19, 2016 and TW application serial No. 106111942, filed on Apr. 10, 2017. The entirety of the above-mentioned patent applications are hereby incorporated by references herein and made a part of specification.

BACKGROUND OF THE INVENTION

Field of the Invention

The disclosure relates to a stylus and a touch control method.

Description of the Related Art

Touch control electronic devices are widely used in various fields. To improve the accuracies of touch inputs on the touch control electronic devices, a stylus is always used for various touch control operations (such as, writing or drawing on a touch screen via input strokes).

Pen strokes are changed by adjusting a tilt angle and a tilt direction of the pen in writing or drawing. The width of the stroke is determined according to the tilt angle and the tilt direction of the pen. Additionally, an axis direction along which the width of the stroke changes is also determined according to the tilt angle and the tilt direction of the pen.

Usually, a conventional stylus is only configured to detect a touch control coordinate to generate the input stroke. When a user wants to change the pattern of the input stroke, such as the width of the stroke, he should set a new pattern by another interface, which is inconvenient.

BRIEF SUMMARY OF THE INVENTION

According to a first aspect of the disclosure, a stylus adapted to a touch panel is provided. The stylus comprises: a barrel, a driving circuit, a conductive tip, and a conductive grip. The driving circuit is disposed inside the barrel and configured to generate a driving signal. The conductive tip is disposed at an end of the barrel and electrically connected to the driving circuit to receive the driving signal. The conductive grip is disposed at the barrel and electrically isolated from the conductive tip. The conductive tip is capacitively coupled with the touch panel via the driving signal to form a first induced capacitor on the touch panel. A capacitance effect is generated between the conductive grip and the touch panel to form a second induced capacitor on the touch panel.

According to a second aspect of the disclosure, a touch control method adapted for a touch control input on a touch panel via a stylus is provided. The stylus includes a barrel, a conductive tip disposed at an end of the barrel, and a conductive grip disposed at the barrel and electrically isolated from the conductive tip.

The touch control method comprises the steps of the follows: A driving signal is generated by the conductive tip to form a first induced capacitor on the touch panel, and generating a capacitance effect between the touch panel and the conductive grip to form a second induced capacitor. A touch control coordinate of the first induced capacitor on the touch panel is calculated. A projection coordinate of the second induced capacitor on the touch panel is calculated. A tilt direction and a tilt angle of the stylus relative to the touch panel are calculated according to a relative position relationship between the touch control coordinate and the projection coordinate.

The stylus, the touch control system and the touch control method in the embodiments are applicable at the touch control electronic device or the touch panel with conventional hardware structures. The touch control system and the touch control method of the disclosure can be implemented by using the original touch control electronic device with updated firmware and driving program and a new stylus. Consequently, the touch control system and the touch control method can be used widely, and the update of the current touch control system is improved.

BRIEF DESCRIPTION OF THE DRAWINGS

These and other features, aspects and advantages of the disclosure will become better understood with regard to the following embodiments and accompanying drawings.

DETAILED DESCRIPTION OF THE EMBODIMENTS

Figure 1:
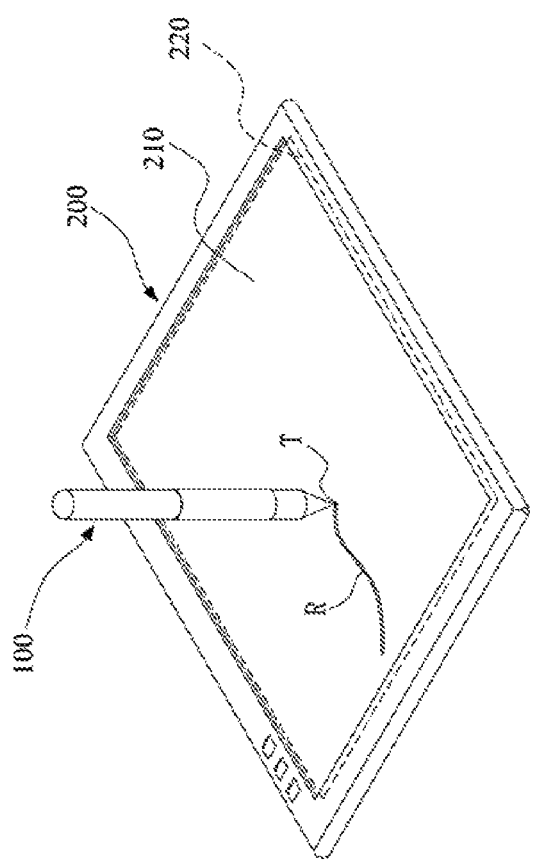
FIG. 1 is a perspective view of a stylus and a touch control electronic device in an embodiment.

Please refer to FIG. 1. In an embodiment, a stylus 100 for operating a touch control electronic device 200 is provided. The stylus 100 generates a touch input signal to perform a touch input on the touch control electronic device 200. The touch control electronic device 200 is configured to detect a tilt status of the stylus 100 to change a pattern of an input stroke R.

As shown in FIG. 1, the touch control electronic device 200 at least includes a touch panel 210 and a display panel 220 disposed beneath the touch panel 210. In an embodiment, the touch panel 210 is a capacitive touch panel. The stylus 100 is adapted to be used with the touch panel 210. A touch operation is performed on the touch panel 210 via the stylus 100 to define a touch control coordinate T and the input stroke R on the touch panel 210. Capacitance changes (which are generated due to the stylus 100) on the surface of the touch panel 210 are sensed by the touch panel 210. The touch control electronic device 200 generates corresponding touch control coordinates T, and displays the input stroke R combined by the continuous touch control coordinates T.

Figure 2:
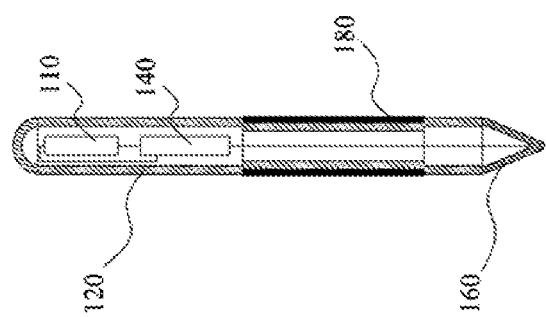
FIG. 2 is an exploded view of the stylus in FIG. 1 in an embodiment.
Figure 3:
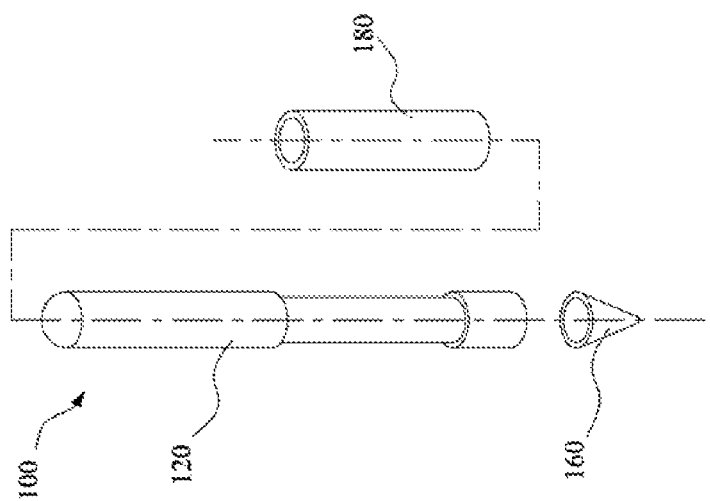
FIG. 3 is a section view of the stylus in FIG. 1 in an embodiment.

As shown in FIG. 2 and FIG. 3, the stylus 100 includes a barrel 120, a driving circuit 140, a conductive tip 160, and a conductive grip 180.

As shown in FIG. 2 and FIG. 3, the barrel 120 is at least partially hollow for containing the driving circuit 140 and a power supply unit 110. The power supply unit 110 includes, but not limited to, a primary battery, a secondary battery, a capacitor or other power supply devices, to provide power to the driving circuit 140.

Figure 4:
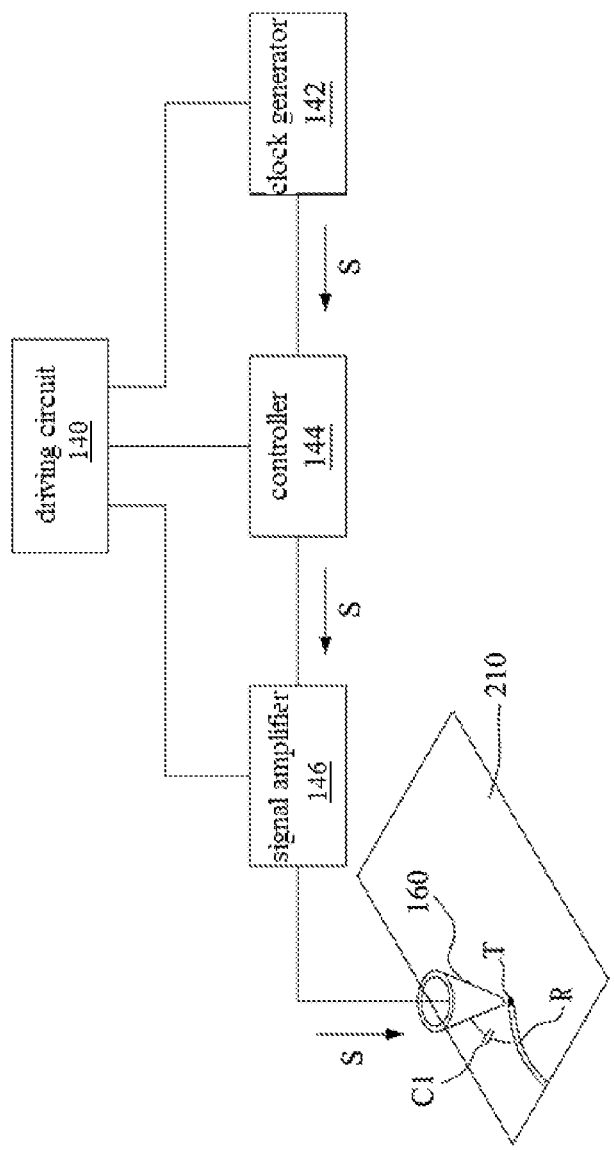
FIG. 4 is a block diagram showing a circuit of the stylus in FIG. 1 in an embodiment.

As shown in FIG. 3 and FIG. 4, the driving circuit 140 is disposed inside the barrel 120. The conductive tip 160 is electrically connected to the driving circuit 140. The driving circuit 140 generates a driving signal S to drive the conductive tip 160. The conductive tip 160 receives the driving signal S. When the conductive tip 160 approaches to or contacts with the touch panel 210 to define the touch control coordinate T, the conductive tip 160 is capacitively coupled with the touch panel 210 via the driving signal S to form a first induced capacitor C1 corresponding to the touch control coordinate T on the touch panel 210. The touch panel 210 detects the first induced capacitor C1 (which is caused by the conductive tip 160) on the touch panel 210. The touch control electronic device 200 calculates a position of the first induced capacitor C1 to obtain the touch control coordinate T, and combines one or more than one continuous touch control coordinates T as the input stroke R.

Please refer to FIG. 4. Details for the driving circuit 140 are described hereinafter. In an embodiment, the driving circuit 140 at least includes a clock generator 142, a controller 144, and a signal amplifier 146.

The clock generator 142 is used to provide the driving signal S, such as a pulse signal with a specific frequency. With the specific frequency of the pulse signal, a frequency-dependent periodic change of the first induced capacitor C1 is generated as a signal feature. With this the signal feature, the first induced capacitor C1 that is caused by the conductive tip 160 is recognized to be distinguished from other induced capacitors by the touch control electronic device 200. In an embodiment, the driving signal S is a periodic/non-periodic signal of other forms that allows the touch control electronic device 200 to distinguish the first induced capacitor C1 from other induced capacitors according to the signal feature of the driving signal S. The controller 144 is electrically connected to the clock generator 142. The controller 144 controls the clock generator 142 to enable or adjust an output of the driving signal S.

The signal amplifier 146 is electrically connected to the clock generator 142 to receive the driving signal S. The signal amplifier 146 amplifies the driving signal S and outputs the driving signal S to the conductive tip 160. The conductive tip 160 receives the driving signal S from the signal amplifier 146. The conductive tip 160 generates the driving signal S to generate an electric field. When the conductive tip 160 approaches to or contacts with the surface of the touch panel 210 to define the touch control coordinate T, a capacitive coupling effect is generated at the touch control coordinate T on the touch panel 210 as the driving signal S is output by the conductive tip 160, and then the first induced capacitor C1 is formed. The touch control electronic device 200 includes a circuit, a firmware and/or a driving program of the touch panel 210 to calculate the touch control coordinate T for the first induced capacitor C1 or to generate the input stroke R according to one or more than continuous touch control coordinates T. Then, a touch control command is generated accordingly.

As shown in FIG. 2 and FIG. 3, the conductive tip 160 is disposed at an end of the barrel 120. The conductive tip 160 is electrically connected to the signal amplifier 146 of the driving circuit 140. The conductive tip 160 receives the driving signal S to generate a pulse electric field or an electric field with a specific periodic change. Thus, the conductive tip 160 is capacitively coupled with the touch panel 210 to form the first induced capacitor C1. The touch control coordinate T or the input stroke R obtained according to the first induced capacitor C1 is used to generate the touch control command for the touch input on the touch control electronic device 200.

For example, when a touch control command for drawing a dot is generated at the touch control coordinate T, the touch control electronic device 200 drives the display panel 220 to display the dot at the touch control coordinate T. In an embodiment, in response to the input stroke R on the touch panel 210, a touch control command for drawing the input stroke R is generated. Thus, the touch control electronic device 200 drives the display panel 220 to display the input stroke R at a corresponding touch position. When the barrel 120 of the stylus 100 is vertical to the touch panel 210, the pattern of the input stroke R, such as the width of the input stroke R and a diameter of the dot, is a pre-set pattern in the system or is user-defined.

Figure 5:
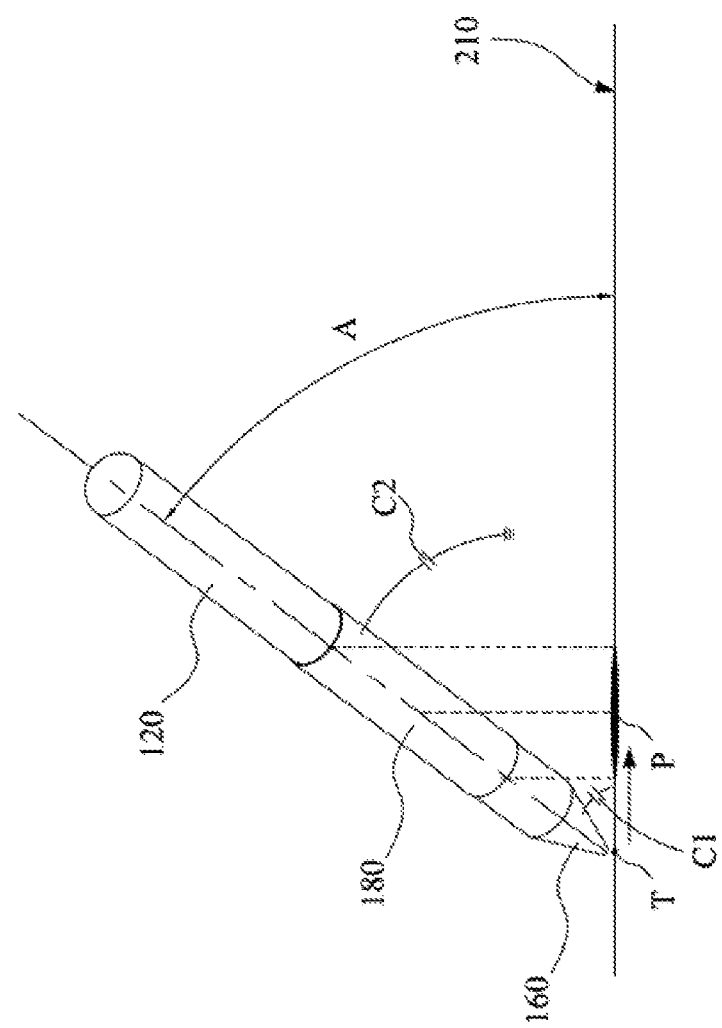
FIG. 5 is a side view of the stylus and a touch panel in FIG. 1 in an embodiment, which shows a capacitance effect between the stylus and the touch panel.

As shown in FIG. 2, FIG. 3 and FIG. 5, the conductive grip 180 is disposed at the barrel 120. The conductive grip 180 is connected to the conductive tip 160 via the barrel 120. The conductive tip 160 and the conductive grip 180 are spaced apart from each other by a distance. A part/all parts of the barrel 120 is non-conductive to make the conductive grip 180 electrically isolated from the conductive tip 160. While the conductive tip 160 approaches to or contacts with the touch panel 210 to define the touch control coordinate T, a capacitance effect is generated between the touch panel 210 and the conductive grip 180 to form a second induced capacitor C2 on the touch panel 210.

The touch control electronic device 200 calculates a projection coordinate P corresponding to the second induced capacitor C2. The direction from the first induced capacitor C1 to the second induced capacitor C2, that is, the direction from the touch control coordinate T to the projection coordinate P, defines a tilt direction B of the stylus 100 on the touch panel 210. The distance between the first induced capacitor C1 and the second induced capacitor C2, that is, the distance between the touch control coordinate T and the projection coordinate P is related to a tilt angle A of the stylus 100 relative to the touch panel 210. The tilt angle A is calculated by the touch control electronic device 200 according to the distances.

When the barrel 120 is long enough for the stylus 100, the conductive grip 180 is disposed at an exterior surface of the barrel 120. The whole of the barrel 120 is made of electrical insulating materials and is non-conductive.

As shown in FIG. 2 and FIG. 3, in an embodiment, the barrel 120 is an elongated hollow barrel. The whole of the barrel 120 is made of electrical insulating materials and is non-conductive. The conductive grip 180 is a sleeve element. The length of the conductive grip 180 is less than the length of the barrel 120. The inner diameter of the conductive grip 180 is equal to or smaller than the outer diameter of the barrel 120. The conductive grip 180 is sleeved on a middle part of the barrel 120.

The conductive grip 180 is fixed to the exterior surface of the barrel 120 by ways of fastening, gluing or embedding.

With the separation of the barrel 120, the conductive grip 180 is electrically isolated from the conductive tip 160. Thus, the capacitance effect between the conductive grip 180 and the touch panel 210, and the capacitance effect between the conductive tip 160 and the touch panel 210 are generated separately. A distance between the conductive tip 160 and the conductive grip 180 is kept long enough to reduce a capacitance effect therebetween to avoid the interference on the detection of the first induced capacitor C1 and the second induced capacitor C2 by the touch panel 210.

Figure 6:
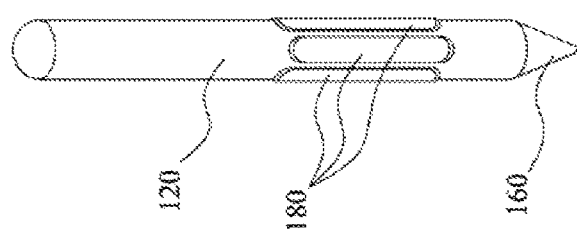
FIG. 6 is a perspective view of a stylus in an embodiment.

As shown in FIG. 6, in an embodiment, the sleeve element, which is used as the conductive grip 180, includes one or more than one openings 182.

Figure 7:
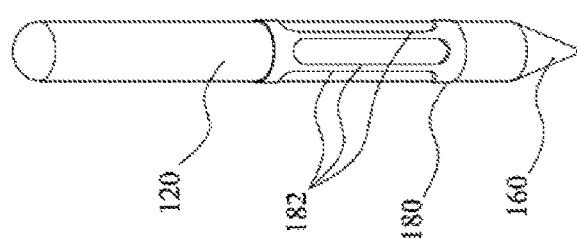
FIG. 7 is a perspective view of a stylus in an embodiment.

As shown in FIG. 7, in an embodiment, the conductive grip 180 includes one or more sheets. The sheets are fixed to the exterior surface of the barrel 120 along the long-axis direction of the barrel 120. In an embodiment, the sheet includes one or more than one openings 182.

Figure 8:
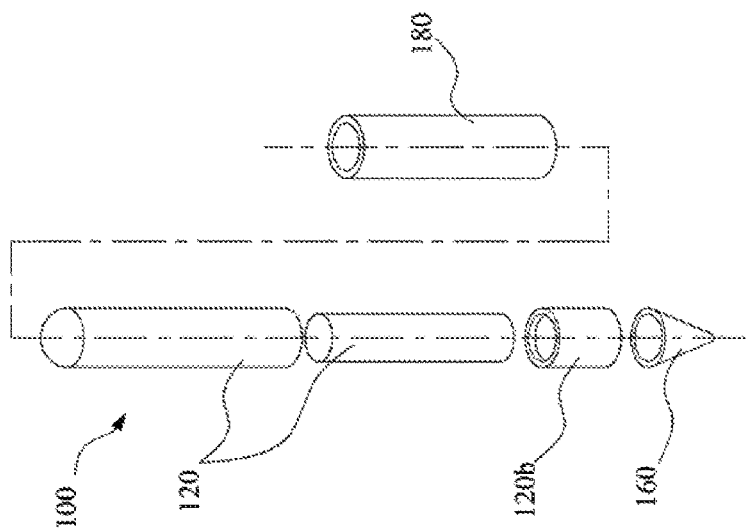
FIG. 8 is an exploded view of a stylus in an embodiment.

As shown in FIG. 8, in an embodiment, the barrel 120 includes a plurality of components that are connected. The components include at least an electrical insulating component 120b. The electrical insulating component 120b is disposed between the conductive grip 180 and the conductive tip 160 to electrically isolate the conductive grip 180 from the conductive tip 160.

Figure 9:
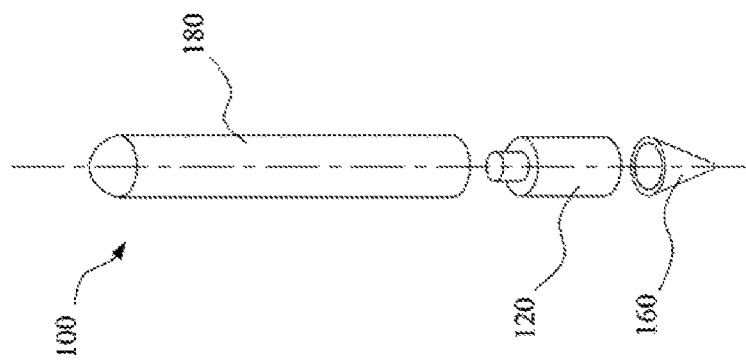
FIG. 9 is an exploded view of a stylus in an embodiment.

As shown in FIG. 9, the conductive grip 180 is not configured at the exterior surface of the barrel 120. In an embodiment, the conductive grip 180 and the conductive tip 160 are connected to two ends of the barrel 120, respectively. A part or all of the barrel 120 is non-conductive.

Figure 10:
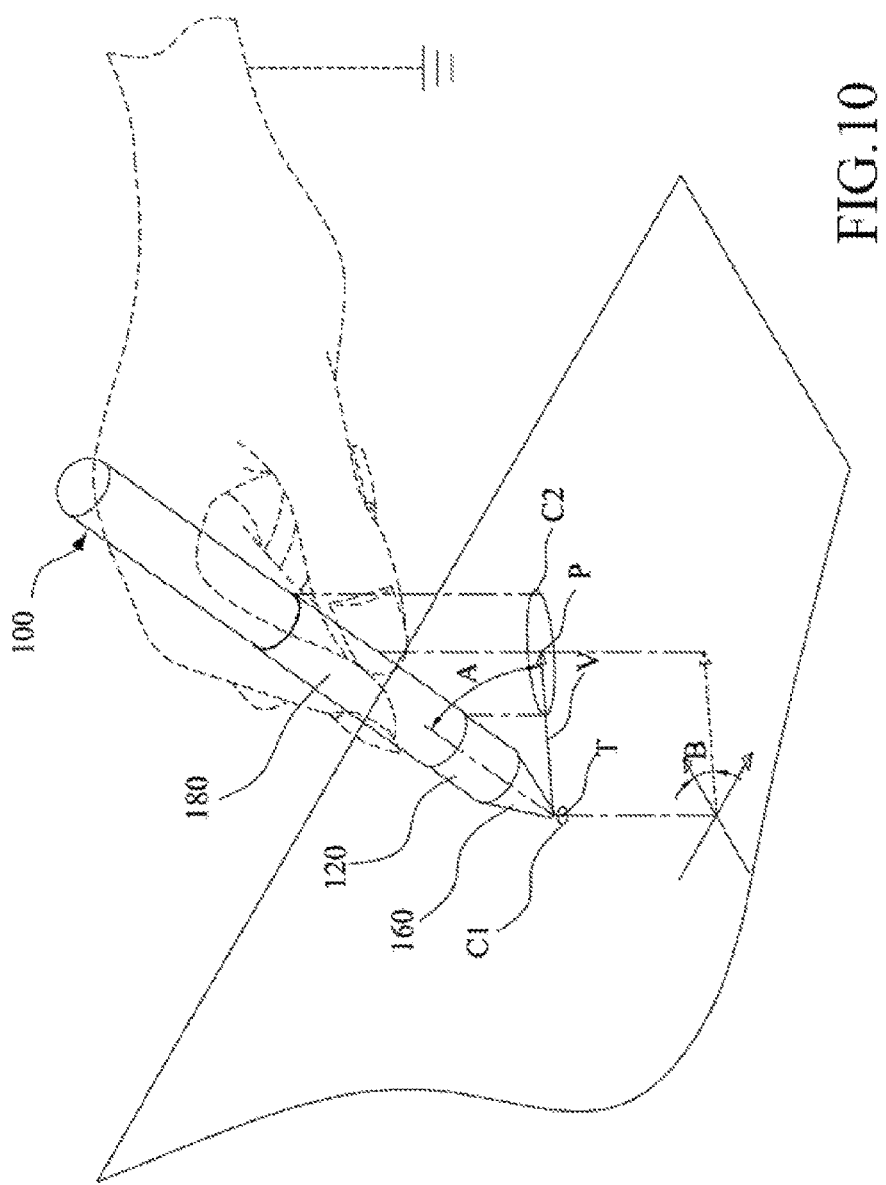
FIG. 10 is a perspective view showing a touch input is performed on a touch panel via a stylus in an embodiment.

As shown in FIG. 10, the conductive grip 180 is configured for the user to hold and operate the stylus 100. When the conductive grip 180 is hold by the user, the conductive grip 180 is electrically conducted with the user. Then, the conductive grip 180 has a potential that is close or equal to the potential of the ground.

When a touch control operation is performed on the touch panel 210 via the conductive tip 160 to form the first induced capacitor C1, a self-capacitance effect or a mutual-capacitance effect is generated between the conductive grip 180 and the touch panel 210 to form the second induced capacitor C2 on the touch panel 210. The generation of the second inductive capacitance C2 is unrelated to the driving signal S. The signal feature of the second inductive capacitance C2 is different from the signal feature of the first induced capacitor C1. Thus, the first induced capacitor C1 and the second induced capacitor C2 can be distinguished from each other by the touch control electronic device 200.

As shown in FIG. 10, the second induced capacitor C2 formed on the touch panel 210 corresponds to a positive projection of the conductive grip 180 on the touch panel 210. The touch panel 210 has a feedback for the second induced capacitor C2 to the touch control electronic device 200. The touch control electronic device 200 calculates the centroid or the center of gravity of the area of the second induced capacitor C2 as the projection coordinate P for the projection of the central point of the conductive grip 180 onto the touch panel 210.

As shown in FIG. 10, the touch control electronic device 200 defines a coordinate system on the touch panel 210, and calculates the touch control coordinate T and the projection coordinate P according to the first induced capacitor C1 and the second induced capacitor C2. A vector V is defined according to a relative positional relationship between the projection coordinate P for the conductive grip 180 and the touch control coordinate T for the conductive tip 160 (that is, the relative positional relationship between the first induced capacitor C1 and the second induced capacitor C2).

The direction of the vector V is defined by a direction from the touch control coordinate T for the first induced capacitor C1 to the projection coordinate P for the second induced capacitor C2. The length of the vector V (an absolute value of the vector V) is a distance L2 between the touch control coordinate T and the projection coordinate P. The direction of the vector V is the tilt direction B of the barrel 120 on the surface of the touch panel 210.

Figure 11:
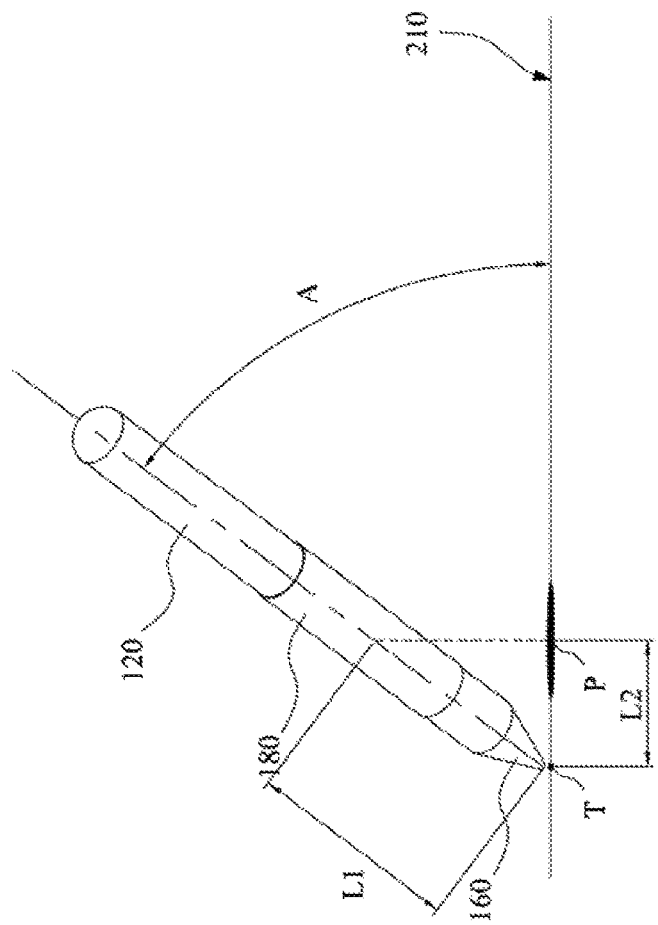
FIG. 11 is a side view of a stylus and a touch panel in an embodiment, which shows a tilt angle of the stylus relative to the touch panel.

As shown in FIG. 11, the touch control electronic device 200 calculates to obtain the tilt angle A of the stylus 100 (that is, the angle between the stylus 100 and the touch panel 210) by using an inverse trigonometric function of an actual distance L1 between the conductive grip 180 and the conductive tip 160, and the distance L2 between the projection coordinate P for the conductive grip 180 and the touch control coordinate T for the conductive tip 160. The tilt angle A meets the following equation:

$$A = \cos^{-1} \frac{L2}{L1}$$

Figure 12:
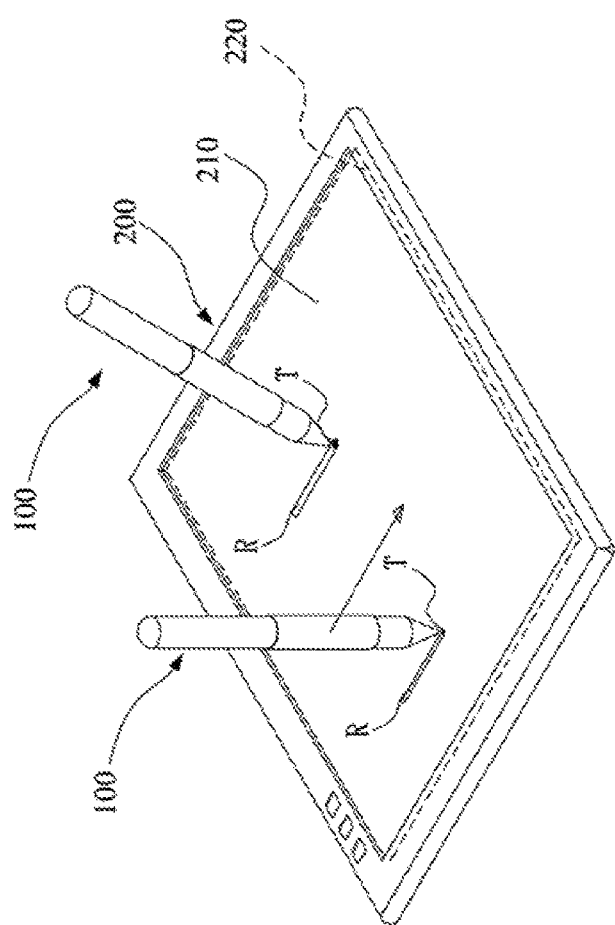
FIG. 12 is a perspective view of a stylus and a touch control electronic device in an embodiment, which shows a relationship between a tilt angle of the stylus and a width of a stroke.

As shown in FIG. 12, a touch control command is generated by the touch control electronic device 200 according to the touch control coordinate T, the tilt direction B, and the tilt angle A. The touch control command can be further adjusted according to the changes of the tilt direction B and the tilt angle A. Thus, the touch control command is more related to the position and orientation information of the stylus 100.

In an embodiment, the display panel 220 is driven by the touch control electronic device 200 to display a stroke according to the touch input signal. When the stylus 100 is vertical to the surface of the touch panel 210, the input stroke R displayed by the display panel 220 has a preset pattern. In an embodiment, the preset pattern is a pattern with a preset width of the input stroke R. The touch control electronic device 200 adjusts the pattern of the input stroke R according to the tilt direction B and the tilt angle A to change the width of the input stroke R. When the user uses the stylus 100 to write or draw on the display panel 220, the input stroke R displayed by the display panel 220 changes in a way similar to a stroke of a common pen on a paper.

Figure 13:
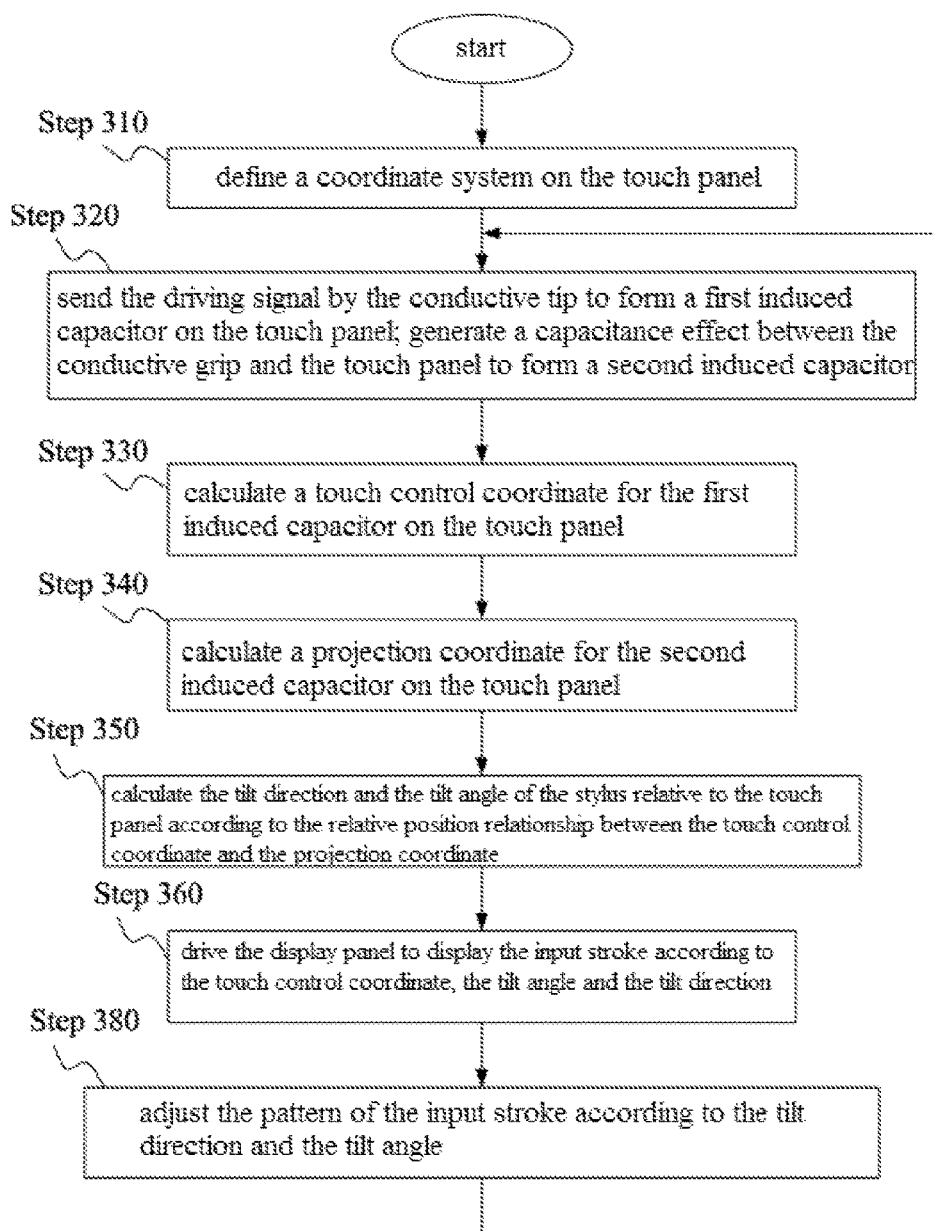
FIG. 13 is a flow chart of a touch control method for detecting a tilt status of a stylus in an embodiment.

As shown in FIG. 13, in an embodiment, a touch control method for performing touch control inputs on the touch panel 210 via the stylus 200 is provided. The touch control method detects the tilt direction B and the tilt angle A of the stylus 100 relative to the touch panel 210 to adjust the pattern of the input stroke R.

In an embodiment, after the touch control electronic device 200 is started, the touch control electronic device 200 is configured to initialize the touch panel 210, and define a coordinate system on the touch panel 210 (Step 310). In an embodiment, the step of initializing the touch panel 210 and defining the coordinate system is performed after the touch control electronic device 200 is started. In other words, the step of initializing the touch panel 210 and defining the coordinate system does not need to be repeated for every touch control input.

When the stylus 100 is in use, the driving circuit 140 generates a driving signal S. The conductive tip 160 generates the driving signal S. The conductive tip 160 is capacitively coupled with the touch panel 210 via the driving signal S to form a first induced capacitor C1 on the touch panel 210. At the same time, the conductive grip 180 approaches to the touch panel 210. The conductive grip 180 is indirectly connected to the ground via the user's holding. A capacitance effect is also generated between the conductive grip 180 and the touch panel 210 to form a second induced capacitor C2 (Step 320).

The touch panel 210 detects data of the first induced capacitor C1. The data of the first induced capacitor C1 includes the number of a detecting unit which detects a capacitance value, the capacitance value detected by each detecting unit. Then, the data of the first induced capacitor C1 feeds back to the touch control electronic device 200. The touch control electronic device 200 calculates a touch control coordinate T for the first induced capacitor C1 on the touch panel 210 according to the feedback of the first induced capacitor C1 (Step 330).

The touch panel 210 detects data of the second induced capacitor C2. The second induced capacitor C2 includes the number of a detecting unit number which detects a capacitance value, the capacitance value detected by each detecting unit. Then, the data of the second induced capacitor C2 feeds back to the touch control electronic device 200. The touch control electronic device 200 calculates a projection coordinate P for the second induced capacitor C2 on the touch panel 210 according to the feedback of the data of the second induced capacitor C2 (Step 340). The sequence of the steps 330 and 340 can be changed, which is no limited herein. In an embodiment, the steps 330 and 340 are performed simultaneously.

The touch control electronic device 200 calculates the tilt direction B and the tilt angle A of the stylus 100 relative to the touch panel 210 according to the relative position relationship between the touch control coordinate T and the projection coordinate P (Step 350). In an embodiment, a way of calculating the tilt direction B and the tilt angle A includes the step of determining the vector V from the touch control coordinate T to the projection coordinate P, and calculating the tilt direction B and the tilt angle A according to the vector V.

The tilt direction B is the direction from the touch control coordinate T to the projection coordinate P, which is the direction of the vector V.

The tilt angle A meets the following equation:

$$A = \cos^{-1}\frac{L2}{L2}$$

wherein L1 is the distance between the conductive tip 160 and the conductive grip 180, and L2 is the distance between the touch control coordinate T and the projection coordinate (the absolute value of the vector V).

In an embodiment, the touch control electronic device 200 drives the display panel 220 to display the input stroke R. The touch control electronic device 200 determines a coordinate position for displaying the input stroke R to drive the display panel 220 to display the input stroke R according to the touch control coordinate T, the tilt angle A and the tilt direction B (Step 360). At the same time, the touch control electronic device 200 monitors the instant changes of the tilt direction B and the tilt angle A, and adjusts the pattern of the input stroke R according to the tilt direction B and the tilt angle A (Step 380). For example, the touch control electronic device 200 adjusts the input stroke R to a pencil stroke, a writing brush stroke, a stroke in bold, a thin stroke, or a stroke in an adjusted color, which is not limited herein.

The stylus, the touch control system and the touch control method in the embodiments are applicable at the touch control electronic device or the touch panel with conventional hardware structures. The touch control system and the touch control method of the disclosure can be applied to an old touch control electronic device with a newly updated firmware or driving program and a new stylus. Consequently, the touch control system and the touch control method disclosed herein are applicable to varies electronic devices, and the usage a current touch control system is thus improved.

Although the disclosure has been disclosed with reference to certain embodiments thereof, the disclosure is not for limiting the scope. Persons having ordinary skill in the art may make various modifications and changes without departing from the scope of the disclosure. Therefore, the scope of the appended claims should not be limited to the description of the embodiments described above.

What is claimed is:

1. A stylus, adapted to a touch panel, comprising:
   a barrel;
   a driving circuit, disposed inside the barrel and configured to generate a driving signal;
   a conductive tip, disposed at an end of the barrel and electrically connected to the driving circuit to receive the driving signal, the conductive tip is capacitively coupled with the touch panel via the driving signal to form a first induced capacitor on the touch panel; and
   a conductive grip, disposed at the barrel and electrically isolated from the conductive tip and the driving circuit, when the conductive grip is connected to ground a capacitance effect is generated between the conductive grip and the touch panel to form a second induced capacitor on the touch panel.

2. The stylus according to claim 1, wherein the driving circuit includes:
   a clock generator configured to provide the driving signal;
   a controller electrically connected to the clock generator and configured to enable an output of the driving signal; and
   a signal amplifier configured to receive the driving signal, amplify the driving signal, and output the driving signal to the conductive tip.

3. The stylus according to claim 1, wherein the conductive grip is connected to the conductive tip via the barrel, part of the barrel is non-conductive and is disposed between the conductive grip and the conductive tip.

4. The stylus according to claim 1, wherein the conductive grip is disposed at an exterior surface of the barrel.

5. The stylus according to claim 1, wherein the barrel includes a plurality of components that are connected, and the components includes at least an electrical insulating component that is disposed between the conductive grip and the conductive tip.

6. The stylus according to claim 1, wherein the conductive grip and the conductive tip are connected to two ends of the barrel.

7. A touch control method, adapted for a stylus while executing an touch input on a touch panel, the stylus includes a barrel, a conductive tip disposed at an end of the barrel, and a conductive grip disposed at the barrel and electrically isolated from the conductive tip, the touch control method comprising:
   generating a driving signal by the conductive tip to form a first induced capacitor on the touch panel, and generating a capacitance effect between the touch panel and the conductive grip by having the conductive grip be connected to ground to form a second induced capacitor;

calculating a touch control coordinate of the first induced capacitor on the touch panel;

calculating a projection coordinate of the second induced capacitor on the touch panel; and calculating a tilt direction and a tilt angle of the stylus relative to the touch panel according to a relative position relationship between the touch control coordinate and the projection coordinate.

8. The touch control method according to claim 7, wherein the tilt direction is a direction from the touch control coordinate to the projection coordinate.

9. The touch control method according to claim 7, wherein the tilt angle meets the function of $$A = \cos^{-1}\frac{L2}{L1},$$

L1 is a distance between the conductive tip and the conductive grip, and L2 is a distance between the touch control coordinate and the projection coordinate.

10. The touch control method according to claim 7, wherein the method further includes:

displaying an input stroke according to the touch control coordinate, the tilt angle and the tilt direction; and adjusting a pattern of the input stroke according to the tilt direction and the tilt angle.

\* \* \* \* \*